Patented June 14, 1932

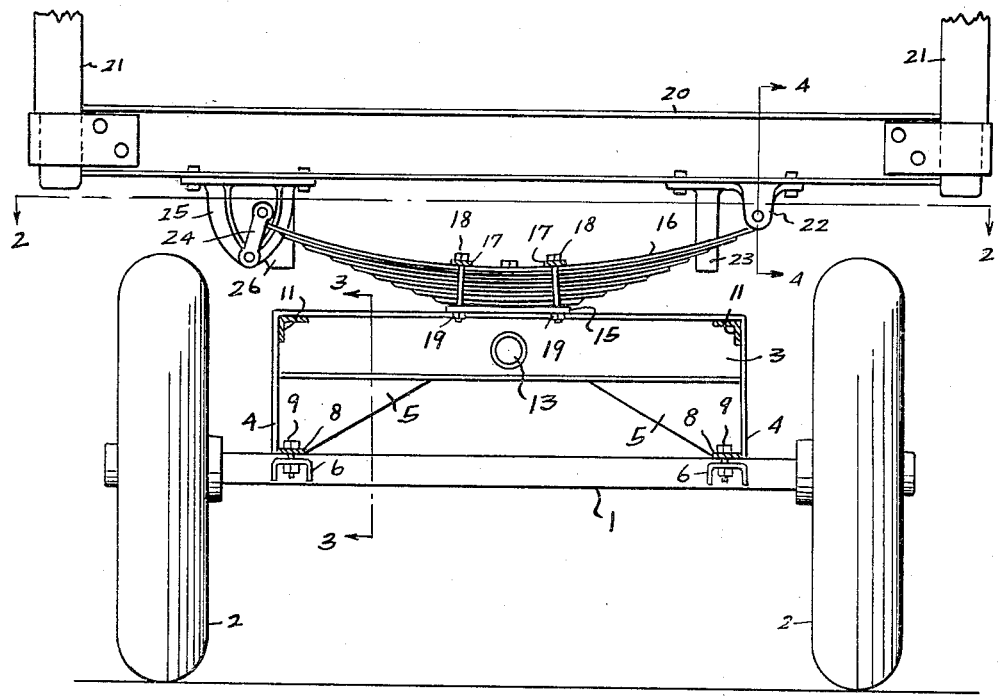
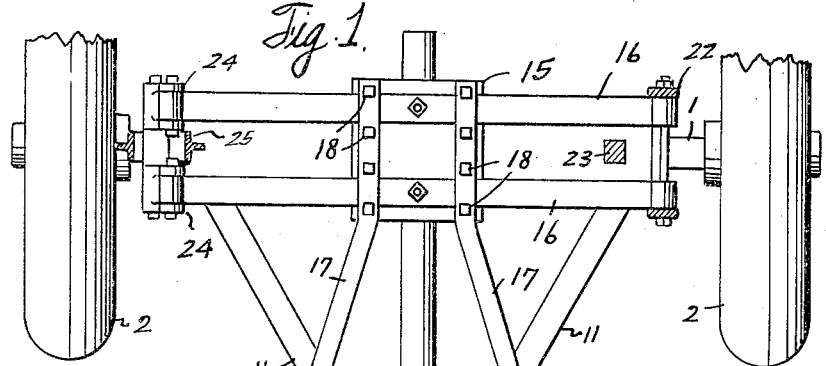
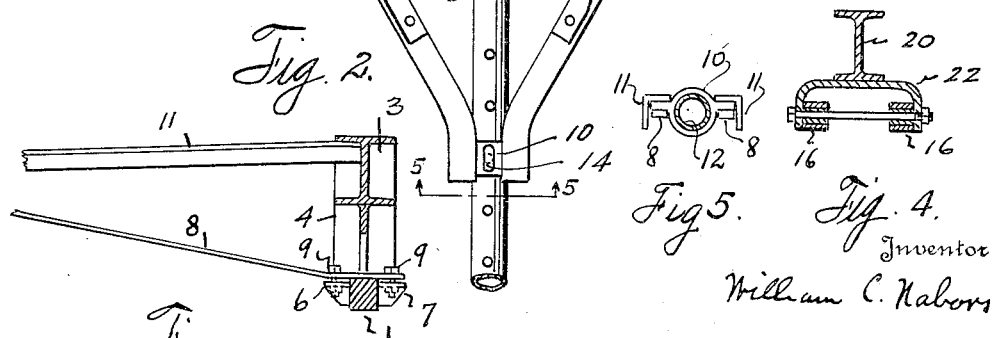

1,863,348

UNITED STATES PATENT OFFICE

WILLIAM C. NABORS, OF MANSFIELD, LOUISIANA

TRAILER

Application filed July 14, 1930. Serial No. 467,667.

This invention relates to new and useful improvements in a trailer for motor trucks.

One object of the invention is to provide a trailer specially adapted for connection to a tractor and comprising an axle supported by the usual ground wheels and in turn having a supporting sill mounted thereon, and a load carrying bolster yieldably mounted on the sill in such manner as to limit if not entirely prevent the side swinging motion of the loads which occur particularly when the trailer is traveling over rough or uneven roads.

Another object of the invention is to provide a trailer of the character described having a novel type of sill and the invention further comprehends a novel and durable construction for supporting the front bearing member of the reach or draw bar through which the trailer may be connected to the tractor.

With the above and other objects in view the invention has particular relation to certain novel features of construction, operation and arrangement of parts, an example of which is given in this specification and illustrated in the accompanying drawing wherein:

Figure 1 shows a front elevation of the trailer, shown partly in section.

Figure 2 shows a horizontal sectional view taken on the line 2—2 of Figure 1,

Figure 3 shows a vertical sectional view taken on the line 3—3 of Figure 1.

Figure 4 shows a vertical sectional view taken on the line 4—4 of Figure 1, and

Figure 5 shows a cross sectional view taken on the line 5—5 of Figure 2.

Referring now more particularly to the drawing wherein like numerals of reference designate similar parts in each of the figures, the numeral 1 designates the axle, which is supported on the ground wheels 2, 2. The numeral 3 designates a transverse sill preferably formed of an I beam, and having the depending end legs 4, 4 which rest on the axle, said legs being reinforced by the gusset plates 5, 5 which are welded to said I beam and to said legs. Welded to the axle adjacent the lower ends of said respective legs are the front brackets 6, 6 and the rear brackets 7, 7, the front brackets being aligned with the corresponding rear brackets and the rear ends of the side straps 8, 8 extend across the axle above said brackets and are secured in place by the clamp bolts 9, which extend through said strap ends and through the corresponding brackets beneath as shown more clearly in Figure 3. These straps converge forwardly and are welded to the bearing sleeve 10 on opposite sides. The side members 11, 11 of the main trailer frame may preferably be formed of angle irons and their rear ends are welded in the upper outer angles of the sill 3 and these side members converge forwardly as shown and their forward ends are also welded to said bearing sleeve. The reach rod 12 works through the bearing sleeve 10 and through an aligned bearing 13 in the sill and its forward end may be connected to said reach rod by means of a suitable linch pin as 14 which may be fitted through said bearing sleeve and through a corrresponding bearing in the reach rod. Secured on the sill 3 there is a supporting plate 15 forming a seat for the leaf springs 16, 16. Reinforcing bars 17, 17 have their rear ends overlying said springs and their forward ends welded to the main side member 11 and suitable clamp bolts 18, 18 are fitted through bearings in the brace bars and in the plate 15 beneath on opposite sides of said springs and threaded onto the lower ends of which are the clamp nuts 19 thus forming means for securely holding the springs on the sill 3.

The numeral 20 designates the bolster which supports the rear end of the load carried by the trailer and tractor in front. The load is retained on the bolster by means of the side standards 21, 21.

The springs at one end are attached to the spring perch 22, which in turn is bolted on the underside of the bolster and this spring perch has a depending bumper 23 between the springs. The other ends of the springs are connected to the upper ends of the spring shackles 24, 24 and the lower ends of these shackles are pivotally connected to the U-shaped bracket 25, arranged between the springs and bolted to the underside of the bolster, and which has a depending bumper 26 arranged between the springs.

The attachment of the springs at one end to the perch 22 will prevent the side swinging of the bolster and the load thereon as the vehicle travels over rough or uneven roads. At the same time the springs will not be restrained in their flexibility, and upon downward movement of the bolster relative to the sill 3, the upper ends of the shackles 24 will move outwardly to permit the springs to assume a straight line position, that is, the bolster 20 will be free to move up and down relative to the sill, but the lateral movement of the bolster, relative to said sill, will be restrained.

The bumpers 23, 26 will limit the downward movement of the bolster by coming into contact with the sill and will thus relieve the springs from becoming overstrained and broken in case of overload or when unusually rough roads are encountered.

The trailer framework hereinabove described will be very strong and durable and yet simple in structure and the novel mounting of the bolster on the springs will eliminate the objectionable side swinging of the load now common with the conventional type of trailer particularly when long loads are being transported.

The drawing and description disclose what is now considered to be a preferred form of the invention by way of illustration only while the broad principle of the invention will be defined by the appended claims.

What I claim is:

1. A trailer comprising an axle, ground wheels supporting the axle, pairs of front and rear brackets attached to the axle, a sill on the axle, a bearing sleeve, straps whose rear ends extend across the axle and are secured to the corresponding pairs of brackets, side members whose rear ends are attached to said sill, the forward ends of said straps and side members being secured to said sleeve.

2. A trailer comprising an axle, ground wheels supporting the axle, pairs of front and rear brackets attached to the axle, a sill on the axle, a bearing sleeve, straps whose rear ends extend across the axle and are secured to the corresponding pairs of brackets, side members whose rear ends are attached to said sill, the forward ends of said straps and side members being secured to said sleeve, a leaf spring on the sill, a bolster on the spring, braces whose rear ends overlie and are anchored to the spring and whose forward ends are secured to said side members.

3. In a trailer an axle supported on ground wheels, a sill having end legs resting on and secured to the axle, gusset plates welded to the sill and the respective legs, brackets secured to the axle, forwardly converging side straps across the axle and secured to said brackets, forwardly converging side members secured to the sill, a bearing sleeve supported by the forward ends of said straps and side members, said sill having a bearing aligned with said sleeve.

4. A trailer comprising an axle, ground wheels supporting the axle, brackets attached to the axle, a sill on the axle, a bearing sleeve, straps whose rear ends are secured to said brackets, side members whose rear ends are attached to the sill, the forward ends of said straps and side members being secured to the sleeve, said sill having a bearing aligned with the sleeve.

5. In a trailer, an axle, a sill thereon, a leaf spring on the sill, a bearing sleeve, straps whose rear ends are attached to the axle, side members whose rear ends are attached to the sill, the forward ends of said straps and side members being secured to said bearing sleeve, a bolster on the spring, braces whose rear ends overlie and are anchored to the spring and whose forward ends are secured to said side members.

In testimony whereof I have signed my name to this specification.

WILLIAM C. NABORS.